Aug. 5, 1958  R. V. KOEHLER ET AL  2,845,815
ACCELERATOR THROTTLE CONTROL
Filed Nov. 30, 1953
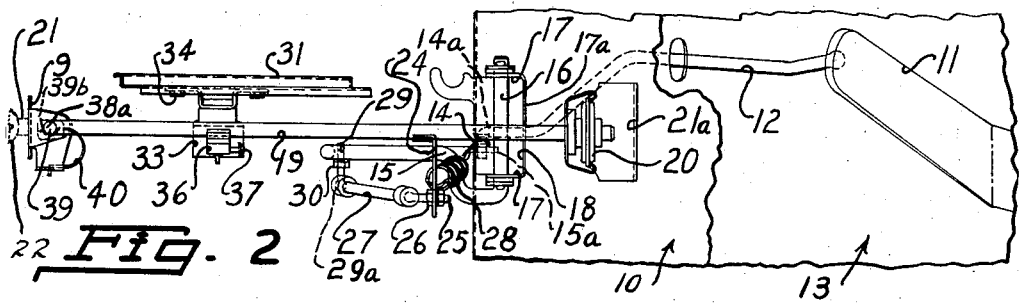
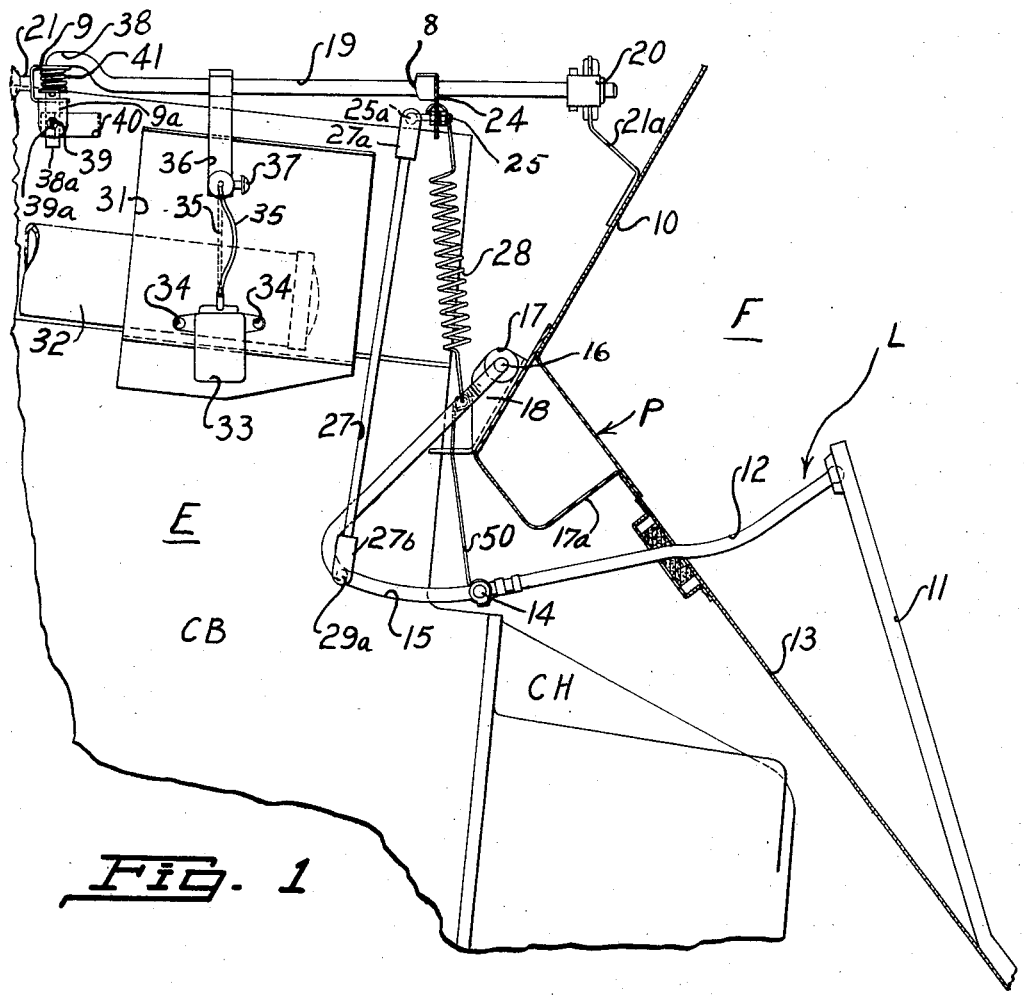
INVENTOR.
RAYMOND V. KOEHLER
MICHAEL BATENBURG
BY
Carl J. Barbee
ATTORNEY United States Patent Office 2,845,815
Patented Aug. 5, 1958

2,845,815

ACCELERATOR THROTTLE CONTROL

Raymond V. Koehler and Michael Batenburg, Kenosha, Wis., assignors to American Motors Corporation, a corporation of Maryland Application November 30, 1953, Serial No. 395,012

4 Claims. (Cl. 74—513)

This invention relates to a carburetor throttle control and more particularly to the linkage used for actuating a carburetor throttle valve.

It is an object of this invention to provide a carburetor throttle linkage which is used to actuate a socalled butterfly valve forming part of the carburetor and an electrical switch.

It is another object of this invention to provide a carburetor throttle linkage that is compact and easy to install. We contemplate providing a linkage arranged so that as an automobile body is assembled on the chassis such linkage will not offer obstacles to lessen the time and increase the effort in such assembly. We contemplate a linkage arrangement which includes elements moving through a predetermined range with respect to actuating a butterfly valve in said carburetor.

A further object of this invention is to provide a carburetor throttle linkage for a motor which is simple in design, economical to manufacture and easy to install in the ordinary motor vehicle.

We are aware of the various constructions heretofore used with respect to mounting carburetor throttle linkage in an internal combustion engine. Under the circumstances it will be manifest that it is our chief aim to generally improve upon prior structures of the general type by providing an arrangement characterized by appreciable refinements and structural improvements.

With our arrangement a substantial amount of time, labor, and loss due to damage is avoided. There is no opportunity of the linkage interferring or getting in the way of parts of an automobile body being assembled on the chassis.

The several objects, advantages, and novel details of construction of the invention will be made more apparent as this description proceeds, especially when considered in connection with the accompanying drawings, wherein:

Figure 1 is a side view of the appaartus showing the invented subject matter.

Figure 2 is a top plan view in perspective of the invention as shown in Figure 1.

Referring to Figures 1 and 2, the invention is shown as it may be used on an automotive vehicle showing the linkage L of the present invention in relation to the cylinder block CB and the clutch housing CH.

A conventional carburetor 22, a small portion of which is shown in Figs. 1 and 2, includes a throttle valve of the butterfly type which is actuated by rotation of pin 21 which has direct connection to such valve.

The linkage apparatus, identified generally by the letter L, for controlling operation of such valve includes rod 12 which extends through the primary panel P which separates engine compartment E from the passenger compartment F of the vehicle. The panel may include the inclined "toe board" portion 13 which merges with the dash panel portion 10. A foot pedal 11 is hingedly connected (not shown) to the toe board and has a ball and socket connection with rod 12. The lower end of said rod is bent substantially at right angles as shown in Fig. 2 at 14a and extends through a suitable aperture in end portion 15a of link 15. Link 15 is bent in the manner of a V and near its upper end is provided with generally U-shaped configuration resulting in a shaft portion 16.

A bracket 17a is anchored to the panel P and outwardly extending ears 17 are suitably apertured to receive the end 16 of link 15 for pivotal movement. The bracket ears 17 may be formed integrally with bracket 18 which is anchored as by welding to the principal bracket 17a. The throttle valve actuating shaft, which may be referred to as the accelerator shaft, has one end rotatably supported in a rubber bearing member 20, the bearing in turn being anchored to bracket 21a which is secured to dash panel 10. Anchored to the accelerator shaft is a bracket 8 including an outwardly extending leg 24, near the outer end of which a stud 25 is anchored as by means of fastening elements 26.

A link 27 is provided with caps 27a and 27b at its opposite ends and the stud 25 has a ball 25a received within a suitable socket in cap 27a thereby affording a universal type connection therewith. A stud 29 is anchored to link 15 as by means of fastening element 30 and has a ball member 29a received within the cap 27b thereby providing a universal type connection with link 15.

A tension spring 28 is connected at one end to the bracket leg 24 and at its other end to the eye formed at the end of the clip 50 which is anchored to the link 15 at the juncture of said link and rod 12. The spring functions to rotate the accelerator shaft to normally close the throttle valve at all times when there is no foot pressure on pedal 11.

Secured to the side of a heat baffle 31, which is adjacent the exhaust pipe 32, is a kick-down switch 33. This switch is secured thereto by any suitable fastening elements 34 and is actuated through a wire 35, the free end of which is removavbly anchored in a recess provided in a bracket 36 by means of a set screw 37.

One end of said bracket 36 is secured to the accelerator shaft. When the linkage is in normal position, as illustrated in Figure 1, the wire hangs loosely.

The accelerator shaft 19 is bent at the end adjacent the carburetor to provide a hook 38 which includes the extended leg portion 38a. A U-shaped bracket 9 has its base portion anchored to pin 21 and its side walls are suitably apertured to permit the accelerator shaft extension 38a to project therethrough. The bracket 9 has an extension 9a and a U-shaped leaf spring 40 is interposed between the bracket extension 9a and the accelerator shaft extension 38a. One end of the leaf spring has an ear 39 formed thereon and projecting through an opening 39a formed in the bracket extension 9a and the other end of the leaf spring is indented at 39b to receive the shaft extension 38a. The leaf spring serves as a cushioning device when the accelerator shaft is rotated to a position in which the throttle valve is fully opened. Additional foot pressure on the pedal 11 at this moment causes the electrical switch 33 to be closed. The spring 41 serves merely for anti-rattling purposes.

In operation the foot pedal 11 is depressed pushing the pedal rod 12 inwardly. This action swings the link 15 about its pivot at 16. The rod 27 pushes against the bracket 24 rotating the accelerator shaft 19 and at the same time extending the pull-down spring 28. The accelerator shaft, being directly associated with the bracket 9 and accordingly, the pin 21, rotates said pin within the carburetor and actuates the butterfly valve in said carburetor through a range of 85 degrees whereby a stop, provided in said carburetor, prevents any further turning of said pin 21. Under ordinary conditions leaf spring 40 is forced up against pin 39, and accordingly, the accelerator shaft maintains sufficient pressure with respect to said accelerator shaft and said bracket 9 to rotate said pin. The accelerator shaft might be said to float at its free end with no apparent connection except that induced by the leaf spring against said pin 21. Continued pressure on pedal 11 continues rotation of said accelerator shaft but in view of the inability of pin 21 to move, the accelerator rod pushes, through pin 39, against the spring 40 and rotates a sufficient distance to exert tension on the wire 35 which actuates the switch 33 bringing about the overdrive condition. Releasing pressure on pedal 11 permits the spring 28 to return to normal position thereby rotating the accelerator shaft counterclockwise and permits the combination to assume normal position.

It is thought that the construction, manipulation, utility, and advantages of this invention will now be apparent to those skilled in this art without a more detailed description thereof.

The present embodiment of the invention has been described in considerable detail merely for the purpose of exemplification since in actual practice it attains the features of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim is:

1. For use with an automotive vehicle having an engine compartment, a passenger compartment, a panel separating said compartments and a carburetor with a throttle valve incorporated therein, apparatus for controlling operation of the throttle valve comprising: an accelerator shaft having one end connected to the throttle valve; a bearing for rotatively supporting the other end of the accelerator shaft; a bracket anchored to the panel and carrying the bearing; a second bracket anchored to the panel beneath the first mentioned bracket; a pedal located in the passenger compartment; an actuating rod extending through the panel and having one end engaged by the pedal and the other end doubled back to form an acute angle, said second bracket rotatably carrying the end of the actuating rod remote from the end which is engaged by the pedal; an arm fixed to the accelerator shaft and extending outwardly therefrom; a link having connection to said arm and to the actuating rod whereby movement of the accelerator pedal effects rotation of the accelerator shaft.

2. For use with an automotive vehicle having an engine compartment, a passenger compartment, a panel separating said compartments and a carburetor with a throttle valve incorporated therein, apparatus for controlling operation of the throttle valve comprising: an accelerator shaft having one end connected to the throttle valve; a bearing for rotatively supporting the other end of the accelerator shaft; a bracket anchored to the panel and carrying the bearing; a second bracket anchored to the panel beneath the first mentioned bracket; a pedal located in the passenger compartment; an actuating rod extending through the panel and having one end engaged by the pedal and the other end doubled back to form an acute angle, said second bracket rotatably carrying the end of the actuating rod remote from the end which is engaged by the pedal; an arm fixed to the accelerator shaft and extending outwardly therefrom; a link having connection to said arm and to the actuating rod whereby movement of the accelerator pedal effects rotation of the accelerator shaft; and a return spring connected to the arm and to the actuating rod for normally urging rotation of the accelerator shaft to throttle valve closing position.

3. Throttle control apparatus as set forth in claim 1 wherein the link is connected to the actuating rod adjacent the apex of the doubled back portion and the spring is connected to said rod in the area between the panel and the apex of the doubled back portion.

4. Throttle control apparatus as set forth in claim 1 wherein cushioning means are included at the end of the accelerator shaft which is connected to the throttle valve whereby rotation of the accelerator shaft in valve opening direction is cushioned at the limit of travel thereof.

No references cited.